Patented Aug. 11, 1936

2,050,802

UNITED STATES PATENT OFFICE 2,050,802

METHOD OF CONDITIONING BARIUM SULPHIDE AND MAKING SODIUM AND ZINC SULPHIDES THEREWITH

Thomas A. Mitchell and Royal L. Sessions, Denver, Colo., assignors, by mesne assignments, to Hughes-Mitchell Processes Incorporated, Denver, Colo., a corporation of Wyoming No Drawing. Application August 23, 1933, Serial No. 686,437

6 Claims. (Cl. 23—134)

This invention relates to the production of zinc and barium sulphides, and particularly to a method of so conditioning a solution of barium sulphide that it may be used for precipitating zinc sulphide from a zinc chloride solution without the formation of zinc hydroxide.

Barium sulphide is ordinarily produced by heating barium sulphate with carbon to a high temperature and then dissolving the sulphide from the residue. It is often found that the water solution of barium sulphide, which tends to dissociate into two components, barium hydrate $Ba(OH)_2$ and barium sulphhydrate $Ba(SH)_2$, contains a greater quantity of barium hydrate or hydroxyl ions than is represented by the theoretical ratio. This is due to various causes, such as the presence of impurities which convert some of the sulphide to the hydrate. Hence, when the solution is mixed with zinc chloride, a small amount of zinc hydrate is formed along with the zinc sulphide; and if the latter is to be used as a pigment, this foreign substance will be present in the calcined pigment as zinc oxide and cause a discoloration of the paint.

It is accordingly the primary object of this invention to so condition a solution of barium sulphide that when employed to precipitate zinc sulphide from a zinc salt solution, it will not cause the formation of zinc hydroxide because of the presence of hydroxyl ion in the reagent solution; and in particular to provide a method of producing zinc sulphide which is suitable for use as a pigment. Other objects will be apparent in the following disclosure.

In order that the purpose and applicability of this invention may be understood, it will be described with reference to the production of zinc sulphide by treatment of a zinc salt solution with a solution derived from barium sulphide, which may involve either the reaction of zinc chloride or sulphate with a sodium sulphide solution made by reaction of barium sulphide on sodium sulphate or the treatment of zinc chloride with a barium sulphide solution derived directly from the salt. Similarly, lithopone may be formed by precipitating a molecular mixture of zinc sulphide and barium sulphate from a zinc sulphate solution.

To make zinc sulphide pigment, a zinc sulphide ore may be roasted under suitable conditions to produce zinc oxide, and this roasted ore is then treated with hydrochloric acid to transpose the zinc oxide to a chloride. After suitable purification steps, the zinc chloride is treated in solution with barium sulphide, thus resulting in a precipitate of zinc sulphide and leaving barium chloride in solution. The zinc sulphide pulp is separated from the solution and washed, and it is then calcined to dehydrate the zinc sulphide and otherwise to prepare the material for use as a pigment in a paint. In a cyclic process, the barium chloride solution, as thus derived, may be reconverted to barium sulphide by reaction with sodium sulphate to form a precipitate of barium sulphate. The latter is separated from the resultant sodium chloride solution without washing with water and then dried and reduced by furnacing it with carbon to form barium sulphide.

This furnacing operation involves making an intimate mixture of the finely divided barium sulphate with coal or other suitable carbon, which is proportioned slightly in excess of the theoretical amount required to reduce the sulphate to a sulphide. We prefer to employ petroleum coke or other iron-free carbon, since the ordinary coal is not sufficiently free from iron. The furnace may be heated internally or externally by a gas flame or other suitable medium in order that the carbon may be employed solely for the reducing operation. This process will be carried on otherwise in accordance with standard procedure, which involves a temperature of 1800° F., more or less, applied to the material for a few hours.

The barium sulphide thus developed may be recovered by leaching the furnace charge with water. It is found that barium sulphide, when dissolved in water, tends to hydrolyze and form $Ba(OH)_2$ and $Ba(SH)_2$ or OH and SH ions. If these remain in their theoretical ratios, then the reaction with zinc chloride will result in the precipitation of zinc sulphide only but if, as often happens, the barium hydrate or hydroxyl content is too great, this results in the formation of zinc hydroxide or hydrated zinc oxide and ultimately in the presence of zinc oxide in the calcined pigment. We propose to eliminate this excess of barium hydrate or hydroxyl ions by adding an alkali metal cyanide thereto until titration of the barium sulphide solution shows that the correct or theoretical molecular ratio of hydrate to sulphhydrate ions has been obtained and the solution has been properly conditioned for the precipitation of pure zinc sulphide.

In our preferred practice, the barium sulphide furnace charge, which is known as "black ash", is pulped with water, and then sodium cyanide is slowly added to the pulp in an amount not greater than one part of cyanide to 1000 parts of concentrated barium sulphide solution and until titration indicates the correct ratio of hydrate to sulphhydrate ions. We find that this is accomplished when the cyanide has been added in the proportion of three and one-half pounds for each 2000 pounds of the dry black ash which is used. This amount of black ash will produce 196 cubic feet of 12° Beaumé barium sulphide solution.

While we do not wish to limit our case to any particular theoretical explanation of the process, yet we believe that there is a slight amount of barium polysulphide formed in the black ash, and that the sodium cyanide unites with this polysulphide to form barium sulphocyanate together with some free sulphur and hydrogen sulphide. This polysulphide is believed to be present in amount sufficient to form enough sodium sulphide to react in turn with the excess of barium hydrate present in the pulp and so convert it to barium sulphhydrate and thus adjust the ratio as required. Any free sulphur formed in the pulp by this reaction will, of course, remain with the pulp when the barium sulphide solution is filtered therefrom. Care should be taken to avoid adding too much sodium cyanide, since otherwise the reaction will proceed to form barium sulphide and sodium sulphocyanide. The desired reaction is believed to be expressed by the following equation:

$$4NaCN + 4BaS_2 = 4BaCNS + 2Na_2S + S_2$$

The undesired reaction caused by the addition of too much sodium cyanide is believed to proceed in accordance with the following equation:

$$2NaCN + BaS_2 = BaS + NaCNS$$

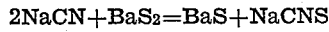

The pulp should not be heated when the sodium cyanide is added to it, but it is preferably kept merely warm to the hand.

In this way, we prevent the presence of zinc hydrate in the zinc sulphide precipitate, which would later be converted to zinc oxide when the material is calcined in a muffle and so serve to impart a yellow color to the pigment. By treating the pulp instead of the solution, we avoid a filtering step, since the precipitated sulphur remains with the pulp along with any other insoluble material that is present. It will also be appreciated that various other cyanides, such as potassium and ammonium cyanides, may be employed for this reaction, and that such materials are to be considered as the equivalent of the sodium cyanide herein described and claimed. This barium sulphide solution may be purified in accordance with other procedures and to eliminate such impurities as are found undesirable in the process. If we treat a purified zinc chloride solution with this conditioned solution of barium sulphide, and the solutions may be in molecular proportions of a required strength, we produce zinc sulphide which is free from zinc hydrate.

It will also be appreciated that we may make zinc sulphide by using sodium sulphide instead of the barium sulphide; and the sodium sulphide may be produced by the reaction of barium sulphide on sodium sulphate. If one should use an unconditioned solution of barium sulphide, which contains an excess of hydroxyl ions over the theoretical ratio, the resultant sodium sulphide would contain the undesired hydroxyl ions and cause the formation of zinc hydroxide when used to treat a zinc sulphate or chloride solution. The above conditioning step may, therefore, be employed for treating the barium sulphide thus used in order to avoid the presence of the excess of hydroxyl ions, first in the barium sulphide and finally in the sodium sulphide solution, with a consequent formation of zinc hydrate in the pigment. Hence, it will be appreciated that this invention applies to this indirect method of making zinc sulphide with the intervention of sodium sulphide as a reagent, as well as to the direct treatment of a zinc salt solution with barium sulphide. The use of sodium sulphide makes it possible to start with either a zinc sulphate or a zinc chloride solution, whereas the barium sulphide requires the use of a zinc chloride solution only since barium sulphate is insoluble. It may also be observed that any excess of polysulphides in the sulphide reagent used to make zinc sulphide will not be objectionable, since the excess of sulphur is removed during the muffling of the pigment. It is to be understood that the reference in the claims to a hydrolyzed solution of barium sulphide having substantially the theoretical ratio of hydroxyl to sulphhydrate ions is to be interpreted in the light of the above explanation of this invention as referring to an aqueous barium sulphide solution containing that ratio of OH to SH ions which is required to react with zinc chloride in aqueous solution and form zinc sulphide with substantially no zinc hydroxide or to react with sodium sulphate in solution and form a sodium sulphide solution substantially free from sodium hydrate.

Having thus described the invention, what is claimed as new and desired to secure by Letters Patent is:

1. The method of conditioning an aqueous barium sulphide solution comprising the steps of adding slowly thereto an alkali metal cyanide, while maintaining the solution at a temperature sufficiently low that the reaction may proceed slowly, testing the solution and limiting the amount of the cyanide to that which is less than 1 part of cyanide to 1000 parts of concentrated barium sulphide solution and only sufficient to provide a hydrolyzed barium sulphide solution having substantially the theoretical ratio of hydroxyl and sulphhydrate ions and thereafter separating any precipitate from the solution.

2. The method of conditioning an aqueous barium sulphide solution comprising the steps of testing the solution and adding alkali metal cyanide thereto in amount less than 1 part of cyanide to 1000 parts of concentrated barium sulphide solution and only sufficient, as determined by said test, to provide a hydrolyzed barium sulphide solution having substantially the theoretical ratio of hydroxyl to sulphhydrate ions.

3. The method of making sodium sulphide comprising the steps of treating sodium sulphate with sufficient barium sulphide in solution to precipitate the sulphate radical as barium sulphate and characterized by the step of preliminarily adjusting the ratio of hydroxyl and sulphhydrate ions in the barium sulphide solution according to the steps of claim 2, whereby the sodium sulphide solution will not be contaminated with sodium hydroxide.

4. The method of making and conditioning a solution of barium sulphide comprising the steps of heating barium sulphate with carbon to reduce it to barium sulphide, pulping the black ash product in water, testing the pulp and adding thereto an alkali metal cyanide in amount less than 1 part of cyanide to 1000 parts of concentrated barium sulphide solution and only sufficient, as determined by said test, to adjust the ratio of the hydroxyl to sulphhydrate ions to substantially the theoretical proportions for a hydrolyzed barium suphide solution, and filtering the solution from the pulp and thereby separating the barium sulphide solution from the precipitated material.

5. The method of making a pigment containing zinc sulphide comprising the steps of precipitating the sulphide from a zinc salt solution by a metal sulphide solution derived from barium sulphide and subsequently calcining the precipitate and characterized by preventing the presence of zinc oxide in the calcined pigment due to an excess of the hydroxyl over the sulphhydrate ions in the hydrolyzed solution of barium sulphide by testing the barium sulphide solution and adding thereto a required amount of alkali metal cyanide, which is less than 1 part of cyanide to 1000 parts of concentrated barium sulphide solution and which is only sufficient as determined by said test to provide substantially the correct ratio of said ions, whereby the formation of zinc hydroxide with the pigment will be minimized.

6. The method of claim 5 in which the barium sulphide solution is derived by heating barium sulphate with carbon to reduce it to the sulphide and pulping the black ash thus formed in water, and in which the pulp is treated with the cyanide to adjust the ratio of hydroxyl to sulphhydrate ions, after which the barium sulphide solution is filtered from the residue.

THOMAS A. MITCHELL.
ROYAL L. SESSIONS.

CERTIFICATE OF CORRECTION.

Patent No. 2,050,802. August 11, 1936.

THOMAS A. MITCHELL, ET AL.

It is hereby certified that error appears in the printed specification of the above numbered patent requiring correction as follows: Page 1, second column, line 40, after "only" insert a semicolon; page 2, first column, line 18, for "hydrogen" read sodium; and that the said Letters Patent should be read with these corrections therein that the same may conform to the record of the case in the Patent Office.

Signed and sealed this 22nd day of September, A. D. 1936.

Henry Van Arsdale (Seal). Acting Commissioner of Patents.